UNITED STATES PATENT OFFICE.

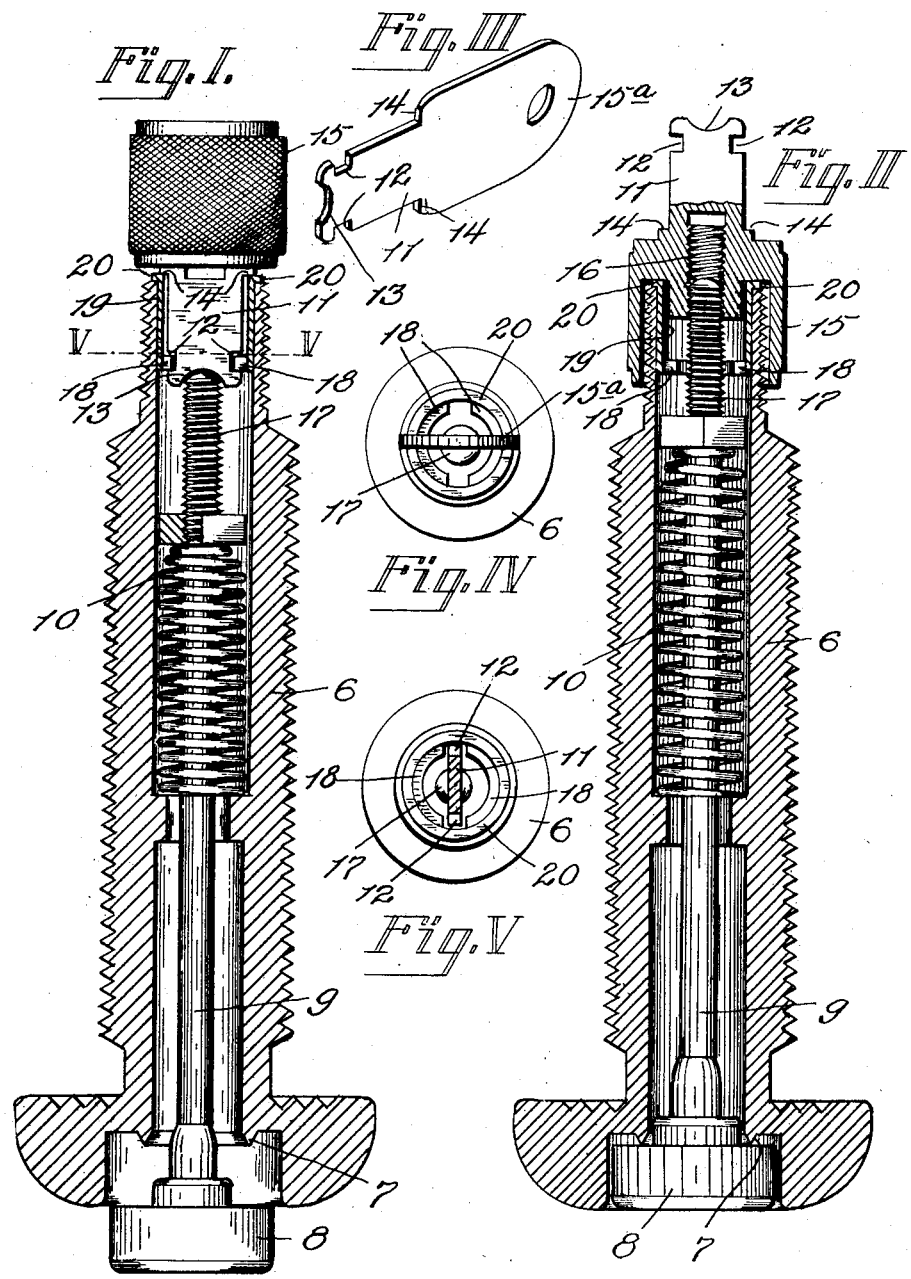

JOSEPH N. NEWSOM, OF ST. LOUIS, MISSOURI, ASSIGNOR TO NEWSOM VALVE COMPANY, OF ST. LOUIS, MISSOURI, A CORPORATION OF MISSOURI.

VALVE CONTROL FOR PNEUMATIC TIRES.

1,392,440.     Specification of Letters Patent.     Patented Oct. 4, 1921.

Application filed February 5, 1920. Serial No. 356,544.

*To all whom it may concern:*

Be it known that I, JOSEPH N. NEWSOM, a citizen of the United States of America, a resident of the city of St. Louis, in the State of Missouri, have invented certain new and useful Improvements in Valve Controls for Pneumatic Tires, of which the following is a full, clear, and exact description, reference being had to the accompanying drawings, forming a part of this specification.

My invention relates to improvements in valve controls for pneumatic tires and my principal object is to provide means, of simple and inexpensive construction, for facilitating the operation of tire deflating, which means comprises a manipulative element for engagement with the valve stem to move it to unseated or open position and an element coacting therewith to hold and lock the same, during the deflating, and, until manually released.

A further object is to provide such a deflating device with a hood whereby it may serve as a valve cap and to further provide the cap with a threaded bore whereby the device may serve as a means for engaging the valve stem and moving it to a fully seated position.

My improvements consist in the novel construction, arrangement and combination of parts, as fully, clearly and concisely set forth hereinafter, definitely pointed out in my claims and illustrated by the accompanying drawing, in which—

Figure I is an elevation of a device constructed in accordance with my invention, as in use, to hold and lock a tire valve in open position, the valve-containing tube being shown in cross section.

Fig. II is a similar view, partly in section, showing the device as employed to hold the tire valve to fully seated position.

Fig. III shows in perspective view of a modification of the device designed for use only as a deflating tool.

Fig. IV is a plan view of the form of device illustrated by Fig. III as in use, and Fig. V is a sectional plan taken on the line V—V of Fig. I.

Referring to the drawing, by numerals, 6 designates the tube proper; 7 the valve seat therein; 8 the valve; 9 the valve-stem and 10 the valve closing spring.

The deflating tool or element comprises a key, such as 11, of a length sufficient to extend into the tube 6 a distance to engage and depress the valve stem to a full open position and of an oblong section, in which there is formed adjacent its lower, or functionate, end opposed wards 12, and by preference there is formed in the extremity of the bit a notch 13 whereby the valve stem is held centralized relative to the key.

At points on the stem of the key remote from the wards 12 are the opposed shoulders or stops 14 which serve to limit the depression of the valve stem beyond a point where its operating spring 10 will be compressed to a sectional dimension obstructing the effluent air.

The key is provided with a manipulating element such as the externally knurled cap 15 or the perforate bow 15$^a$ (shown in Fig. III).

The key having the cap is provided with an axial, threaded, bore 16 for engagement upon the threaded portion 17 of the valve stem as shown in Fig. II to serve as a means for drawing the stem in a direction to bring the valve to fluid tight contact with the seat 7.

The locking means for the deflating tool comprises a pair of opposed, fixed wards 18 for coaction with the wards 12 of the key to lock the key in a position holding the valve in open or deflating position.

By preference such fixed wards are made as inturned, segmental flanges of a sleeve 19 which is forced into the upper end of the tube 6, and by further preference the sleeve is provided with an outwardly turned flange 20, at its uppermost end which determines the placement of the wards 18 carried by the sleeve. Hence by forcing the sleeve within the tube with the flange 20 resting upon the end of the tube the ward flanges will be properly related to the length of key stem to relate the wards 12 and 18.

The stops 14 as best shown in Fig. I serve to hold the cap end spaced from the tube end for free passage of the effluent air at a time when the key is holding the valve stem in deflating position.

I claim:

1. In a valve control of the class described an element comprising wards arranged for fitment in a valve tube to be engaged by a valve-stem depressing key.

2. In a valve control the combination of a key, for depressing a valve stem, having wards and an element, having wards for coaction with the wards of the key, for fitment in a valve tube.

3. In combination with a valve tube having a seat, a valve and a spring actuated valve-stem, a sleeve having wards and means for determining its location in the tube, and a manipulative element having a key for engagement with the valve stem to move it to deflating position, and wards in said key for coaction with the wards of the sleeve for locking the key to deflating position.

In testimony that I claim the foregoing I hereunto affix my signature.

JOSEPH N. NEWSOM.